(12) United States Patent
Chisholm

(10) Patent No.: US 6,631,667 B1
(45) Date of Patent: Oct. 14, 2003

(54) EXPLOSIVE-BOLT-ACTIVATED SPRING-LOADED ACTUATION DEVICE

(75) Inventor: Bruce E. Chisholm, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 3 days.

(21) Appl. No.: 09/695,236

(22) Filed: Oct. 25, 2000

(51) Int. Cl.$^7$ ................................................ F16B 37/08
(52) U.S. Cl. ...................... 89/1.14; 411/427; 411/433
(58) Field of Search .................... 89/1.14; 102/378; 411/427, 433

(56) References Cited

U.S. PATENT DOCUMENTS

| | | |
|---|---|---|
| 1,203,058 A | 10/1916 | Scoville |
| 1,203,059 A | 10/1916 | Scoville |
| 1,234,358 A | 7/1917 | McCandlish |
| 2,131,037 A | 9/1938 | Brayton |
| 2,330,490 A | 9/1943 | Hibbs |
| 2,544,358 A | 3/1951 | Schermuly |
| 3,279,374 A | 10/1966 | Parker et al. |
| 3,498,223 A | 3/1970 | Andersson et al. |
| 3,554,127 A | 1/1971 | Becker |
| 3,597,919 A * | 8/1971 | Lilly .......................... 60/634 |
| 3,705,551 A | 12/1972 | Berlin et al. |
| 3,754,496 A * | 8/1973 | Noel .......................... 89/1.14 |
| 4,372,427 A * | 2/1983 | Rogier ....................... 188/72.1 |
| 4,410,293 A * | 10/1983 | Elias et al. |
| 4,412,420 A * | 11/1983 | Patriichi et al. |
| 4,506,606 A | 3/1985 | Caruso |
| 4,524,343 A * | 6/1985 | Morgan et al. |
| 4,617,866 A | 10/1986 | Simpson |
| 4,846,209 A * | 7/1989 | Martini |
| 5,160,233 A * | 11/1992 | Darin |
| 5,221,171 A * | 6/1993 | Rudoy |
| 5,282,709 A * | 2/1994 | Chaput et al. |
| 5,312,152 A * | 5/1994 | Woebkenberg |
| 5,364,046 A * | 11/1994 | Dobbs et al. |
| 5,603,595 A * | 2/1997 | Nygren |
| 5,635,667 A | 6/1997 | Boyer et al. |
| 5,671,650 A * | 9/1997 | Aubret |
| 5,695,306 A * | 12/1997 | Nygren, Jr. |
| 5,771,742 A * | 6/1998 | Bokaie et al. |
| 6,269,748 B1 * | 8/2001 | Rudoy et al. |

* cited by examiner

Primary Examiner—Michael J. Carone
Assistant Examiner—Troy Chambers
(74) Attorney, Agent, or Firm—Burns, Doane, Swecker & Mathis, LLP

(57) ABSTRACT

A pin pulling device moves a member such as a pin or shaft by a non-pyrotechnic actuation force, such as a spring(s). The actuation member or spring(s) is (are) held in the compressed and loaded position by a release mechanism, such as an explosive bolt coupled to the member through a retainer. When activated by a signal, the release mechanism is severed from the retainer and the member is actuated by the force of the actuation member or compressed springs as the springs expand.

14 Claims, 2 Drawing Sheets

EXPLOSIVE-BOLT-ACTIVATED SPRING-LOADED ACTUATION DEVICE

Figure 1:
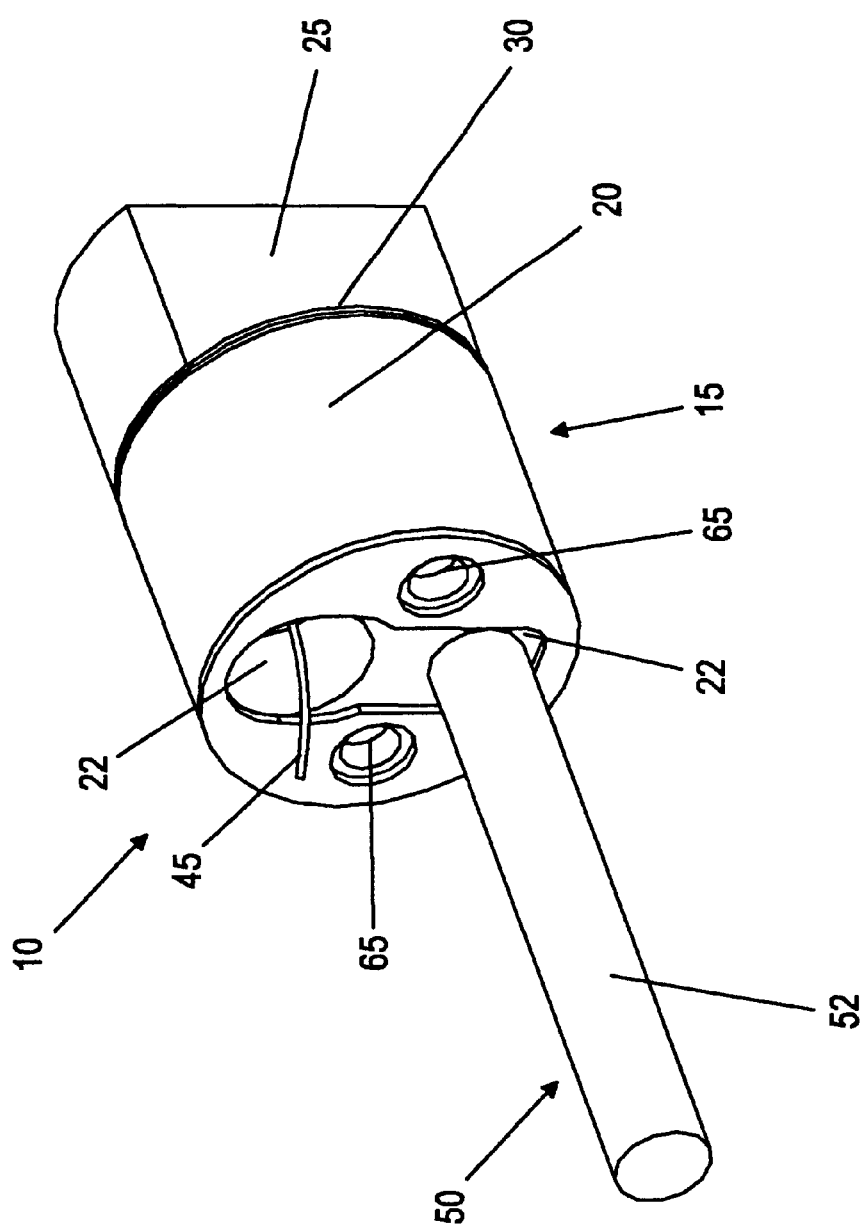

This invention was made with Government support under contract no. F08626-95-C-0106 awarded by the U.S. Department of Defense. The Government has certain rights to this invention.

BACKGROUND OF THE INVENTION

1. Field of the Invention

The present invention is related to an actuation device. More particularly, the present invention is related to an explosive activated spring actuated device.

2. State of the Art

In the discussion of the state of the art that follows, reference is made to certain structures and/or methods. However, the following references should not be construed as an admission that these structures and/or methods constitute prior art. Applicant expressly reserves the right to demonstrate that such structures and/or methods: do not qualify as prior art against the present invention.

Certain actuation devices in use today, such as pin pullers, use a piston housed in a cylinder which is pressurized by a pyrotechnic charge. The pyrotechnic charge is detonated by an electrical current or other means. The resulting gas pressure forces the piston and an integral pin or shaft associated with it to move over a predetermined distance. The piston and pin or shaft are unique to the particular device application.

Conventional devices having the above-mentioned construction, and their associated methods, pose certain problems and disadvantages.

First, devices of the above-described construction are one-time use or "one-shot" devices.

Second, the use of the pyrotechnic force for activation and actuation of the device presents certain difficulties.

Use of the pyrotechnic charge for actuation results in ballistic shock impact forces that must be taken into account in the design of the device. For instance, the housing and the pin of such devices must be designed with sufficient strength to withstand the forces created upon detonation of the pyrotechnic charge.

Also, since the explosive gas pressure created by the pyrotechnic charge dissipates immediately after actuation, a means of preventing "bounce-back" of the actuated pin is required. Typically, such devices are provided with a mechanism for locking the pin in its actuated position. The requirement of providing such mechanisms further complicates the design.

Moreover, choosing the proper size of the pyrotechnic charge is not a simple task. Generally, the charge must be large enough to effectively actuate the piston and its integral pin or shaft, but cannot be so large that it causes problems such as excessive "bounce-back", or fracture, of the pin.

The design of such devices is even more difficult when the pin or shaft to be actuated is relatively heavy. In attempting to design such a device for actuation of a relatively heavy pin it has been found that conventional practices for sizing the pyrotechnic charge and dealing with the ballistics of the device are inadequate to lock the pin, and thereby prevent bounce back.

Thus, there is a need for an improved actuation device, and associated method, which are both reliable and economical.

SUMMARY OF THE INVENTION

According to the present invention, device and method are provided which overcome the disadvantages set forth above, and others.

According to one aspect, the present invention provides a pin puller device comprising: a housing; a non-pyrotechnic actuation mechanism disposed within the housing; a release mechanism constructed to initiate the release of the actuation mechanism in response to an activation signal; and a pin or shaft member operatively associated with the actuation mechanism.

According to a further aspect, the present invention provides a method of actuating a pin or shaft, the method comprising: providing a housing; providing a non-pyrotechnic actuation device within the housing; providing a release mechanism; providing a pin or shaft operatively associated with the actuation mechanism; transmitting an activation signal to the release mechanism; releasing the actuation mechanism; and actuating the pin or shaft.

BRIEF DESCRIPTION OF THE DRAWING FIGURES

Figure 2:
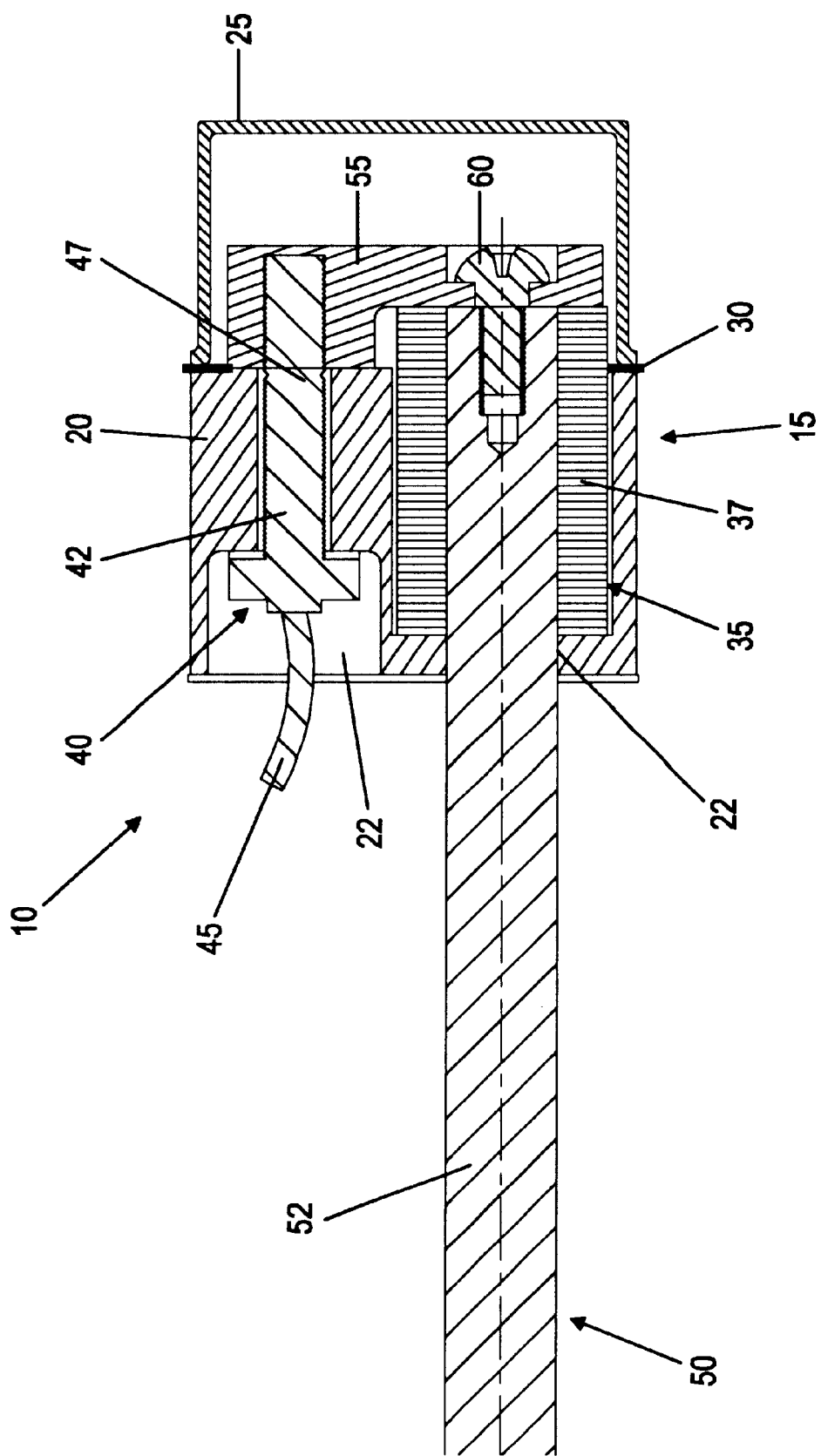

The objects and advantages of the invention will become apparent from the following detailed description of preferred embodiments thereof in connection with the accompanying drawings in which like numerals designate like elements and in which:

FIG. 1 is a perspective view of an embodiment of an actuation device according to the present invention; and FIG. 2 is a longitudinal cross-sectional view of the device of FIG. 1.

DETAILED DESCRIPTION OF PREFERRED EMBODIMENTS

According to the present invention, a device, and its associated method are provided in which a member to be actuated which is operatively associated with the device is actuated through separate release and actuation mechanisms. Preferably, the actuation mechanism is a non-pyrotechnic mechanism. By providing separate and distinct release and actuation mechanisms, the forces required for the release and actuation functions are separated, and thus become more manageable thereby facilitating design of the overall device. The terms "release or activation" and "actuation" should be clear to those of ordinary skill in the art, particularly when taken in light of the description which follows.

Numerous configurations or devices, and their associated methods, are comprehended by the concepts of the present invention. Specific embodiments of the present invention are described below, aided by reference to FIGS. 1 and 2.

FIGS. 1 and 2 illustrate a device 10 which is constructed consistent with the principles of the present invention. The device 10 preferably includes a housing 15. The housing 15 can have any suitable construction. It is contemplated that the specific configuration of the housing 15 can vary greatly, depending on the particular device and its intended use or application. In the embodiment illustrated in FIGS. 1 and 2, the housing 15 includes a base 20 having one or more through holes 22 disposed therein, and a cooperating cover 25. A gasket member 30 may be provided between the base and cover for the purpose of providing an appropriate seal. The material(s) from which the housing 15 and its components are constructed depends upon the intended application or use of the device. For example, the housing 15 and its components can be constructed of a stainless steel, which provides mechanical strength and corrosion resistance. The gasket 30 can be constructed of any suitable material, such as silicone rubber.

The device 10 further includes an actuation mechanism 35. Preferably, the actuation mechanism is non-pyrotechnic. Numerous mechanisms are envisioned. One particularly suitable mechanism is a spring. The use of springs for the actuation mechanism 35 are beneficial in that the forces generated by such springs are easily determined and/or modified thereby facilitating design of the device 10. In the illustrated embodiment, actuation mechanism 35 is shown in the form of an arrangement of belleville springs or washers 37. The belleville springs 37 are beneficial in that they are particularly compact thereby reducing the space necessary for incorporating the actuation mechanism into the device 10.

A separate release or activation mechanism 40 is also provided in the illustrated device 10. In certain embodiments, the release or activation mechanism 40 is provided with a construction that it is responsive to an actuation signal. It is within the scope of the present invention that the release or activation mechanism 40 be constructed in a manner which is responsive to one or more of any number of different types of signals. In certain embodiments, the release or activation mechanism 40 is constructed to be responsive to an electrical signal. In the illustrated embodiment, the release or activation mechanism 40 is shown as an explosive bolt 42. The explosive bolt 42 is provided with electrical connectors in the form of wires 45 for the purposes of transmitting an activation signal. The explosive bolt 42 is further provided with a scribe mark 47 which creates a weakness in the bolt which fractures upon activation of the explosive bolt 42.

A member to be actuated 50 is further operatively associated with the overall device 10, as well as the actuation mechanism 35. The particular type of member to be actuated can vary considerably depending upon the intended use or application of the device 10. For example, the member 50 can be constructed for reciprocating and/or rotating actuating movements, cutting, and/or the fracturing of frangible materials. In the illustrated embodiment, member 50 is in the form of a pin or shaft 52.

The above described components can be operatively arranged in any suitable fashion. In the illustrated embodiment, the pin or shaft 52 and the explosive bolt 42 are received within a respective through-hole 22 formed in the base 20. One end of both the pin or shaft 52 and the explosive bolt 42 are connected to a retainer member 55. The connection can be made by any suitable means. For example, the end of explosive bolt 42 may be threaded into a cooperating threaded blind hole formed in retainer 55, while the pin or shaft 52 is attached to retainer 55 via a threaded fastener or screw 60. A suitable number of belleville springs 37 are received between the base 20 and the retainer 55. The particular number of belleville springs 37 utilized will depend primarily upon the force necessary to actuate the pin or shaft 52, as well as the space limitations imposed on the device 10. In the illustrated embodiment, thirty-two such belleville springs 37 are utilized. The cover 25 is then mounted to the base 20 with an intervening gasket 30.

The device of the present invention has a variety of applications in both commercial and military mechanical systems. One specific example is the incorporation of the device 10 of the present invention into the tail housing of an ordinance, with the pin or shaft 52 protruding into a locking mechanism in the control surface gearing (not shown). The wires 45 of the explosive bolt 42 are connected to the control circuitry of the ordinance. The device 10 is mounted to the tail housing of the ordinance by mounting screws (not shown) which are received within the mounting holes 65.

An illustrative mode of operation is described as follows. An activation signal, such as an electrical current, is carried through wires 45 and into the explosive bolt 42. The explosive bolt 42 detonates and breaks in two, preferably along the scribe mark 47, thereby releasing the compressed belleville springs 37 causing the retainer 55 and the attached pin or shaft 52 to travel backwards within the housing 15 within the space defined between the retainer 55 and the cover 25. In the context of the specific control surface gearing application discussed above, the pin or shaft 52 would be withdrawn from the locking mechanism of the gearing, thereby enabling activation of the control surface mechanism of the ordinance.

Among the advantages, of the present invention, particularly over a purely pyrotechnic design, is that the forces required to activate or release the member and the force required to actuate the member are independent and thus more manageable. A spring can be sized for the required load to pull the pin out of a control mechanism, and the explosive bolt charge can be sized for breaking of the bolt. No locking device at the end-of-stroke is necessary because residual spring force sufficiently holds the pin in its actuated position, and little or no bounce-back occurs. Ballistic shock impact is eliminated with a resulting reduction in required strength of the pin and the housing. Also, fewer part types are used and the final production cost for this unit is significantly less than conventional designs.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

I claim:

1. A pin puller device comprising:
    a housing;
    a non-pyrotechnic actuation mechanism having a longitudinal axis disposed within the housing;
    a release mechanism comprising an explosive bolt having a longitudinal axis constructed to initiate the release of the actuation mechanism in response to an activation signal;
    the release mechanism and the actuation mechanism being disposed in a relatively non-coaxial manner; and
    a pin or shaft member operatively associated with the actuation mechanism.

2. The device of claim 1, wherein the housing comprises a base having a first through hole for receiving the release mechanism and a second through hole for receiving the pin or shaft member, and a cover.

3. The device of claim 2, further comprising a gasket disposed between the base and the cover.

4. The device of claim 1, further comprising a retainer disposed within the housing, the actuation mechanism and the release mechanism being connected to the retainer.

5. The device of claim 4, wherein the pin or shaft is connected to the retainer by a threaded fastener.

6. The device of claim 1, wherein the actuation mechanism comprises a spring.

7. The device of claim 6, wherein the spring comprises a plurality of belleville springs.

8. The device of claim 4, wherein the actuation mechanism is disposed between the retainer and a base.

9. The device of claim 1, wherein the housing comprises a base having a through hole, the device further comprising a retainer, and the release mechanism comprises an explosive bolt received within the through hole in the base and has an end releaseably connected to the retainer.

10. The device of claim 1, wherein the release mechanism comprises means for transmitting the activation signal.

11. The device of claim 10, wherein the means for transmitting comprises wires, and the activation signal is an electrical signal.

12. A device comprising:

a housing;

a non-pyrotechnic actuation mechanism having a longitudinal axis disposed within the housing;

a release mechanism comprising an explosive bolt having a longitudinal axis constructed to initiate the release of the actuation mechanism in response to an activation signal;

the release mechanism and the actuation mechanism being disposed in a relatively non-coaxial manner; and a member to be actuated operatively associated with the actuation mechanism.

13. The device of claim 12, wherein:

the housing further comprises a base having a plurality of through holes and a cover coupled to the base;

a retainer slidably disposed within the housing;

the actuation mechanism disposed between the base and the retainer;

the release mechanism disposed within one of the through holes and releasably connected to the retainer; and the member received within one of the through holes and having an end fixed to the retainer.

14. The device of claim 13, wherein the actuation mechanism A comprises a spring.

* * * * *

UNITED STATES PATENT AND TRADEMARK OFFICE
CERTIFICATE OF CORRECTION

PATENT NO. : 6,631,667 B1
DATED : October 14, 2003
INVENTOR(S) : Bruce E. Chisholm It is certified that error appears in the above-identified patent and that said Letters Patent is hereby corrected as shown below:

Column 6,
Line 18, delete "A".

Signed and Sealed this

Sixth Day of April, 2004

JON W. DUDAS
*Acting Director of the United States Patent and Trademark Office*